United States Patent [19]

Zimmerman

[11] Patent Number: 5,795,004
[45] Date of Patent: Aug. 18, 1998

[54] HAND HELD DEVICE FOR ELEVATING OBJECTS

[76] Inventor: John Zimmerman, 7576 Normal Ave., Apt. C, La Mesa, Calif. 91941

[21] Appl. No.: 908,917

[22] Filed: Aug. 8, 1997

[51] Int. Cl.$^6$ ............................................. B25J 1/06
[52] U.S. Cl. ................................. 294/119; 294/19.1
[58] Field of Search .......................... 294/1.4, 1.5, 15, 294/17, 19.1, 22, 23, 24, 50.6, 50.8, 50.9, 119; 254/131, 131.5, 132

[56] References Cited

U.S. PATENT DOCUMENTS

| | | | |
|---|---|---|---|
| 803,142 | 10/1905 | Ward | 254/131.5 |
| 2,791,462 | 5/1957 | Solway | 294/50.9 |
| 3,035,816 | 5/1962 | Conant | 254/131.5 |
| 3,112,135 | 11/1963 | Salomonson | 294/16 |
| 4,374,600 | 2/1983 | Van Zelm | 294/19.1 |

FOREIGN PATENT DOCUMENTS

| | | | |
|---|---|---|---|
| 3412-339 | 10/1984 | Germany | 294/1.4 |

*Primary Examiner*—Dean Kramer
*Attorney, Agent, or Firm*—Gilliam, Duncan & Harms

[57] ABSTRACT

A device for scooping or grasping an object on the floor and then lift it to hand level. This device is primarily for use by a person who cannot bend to pick up an object from the floor. An extendable/retractable lazy tong assembly is connected at one end to an extension on a cane-like member and at the other to a scoop assembly. The scoop includes two hinged halves that move apart, are placed around an object, are moved together to scoop up the object. By pressing the cane extension against the floor, the lazy tongs are caused to rotate and extend, lifting and moving the scoop to within reach of the user's hands without requiring the user to bend over. The scoop can also include pinch bars for pinching, then lifting, a flexible sheet, such as paper or cloth. A thin bar may be provided on the scoop for insertion into items such as key rings or necklaces to lift them to the user's hand level.

13 Claims, 3 Drawing Sheets

HAND HELD DEVICE FOR ELEVATING OBJECTS

FIELD OF THE INVENTION

This invention relates to a device useful to a person having a physical impairment preventing bending to grasp an object lying on the ground, floor or other lower surface and lifting the object to a higher level.

BACKGROUND OF THE INVENTION

Many people are physically impaired due to arthritis or other conditions to the point where they cannot easily bend over and reach an object on the ground, floor, a low shelf, etc., pick it up and return to an upright position.

A number of different devices have been developed for grasping objects at a distance and moving them to a different location. Typical of these are the so-called "pooper scoopers" that have a scoop of some sort at the end of a handle for picking up animal excrement. These type devices often require the user to bend over and push the excrement into the scoop for moving to a receptacle. Examples include the devices disclosed by Flood in U.S. Pat. No. 5,033,781 and by Eiffinger in U.S. Pat. No. 4,240,656. While effective for that purpose, they are generally not useful to a person who cannot bend over and are not capable of grasping an object and lifting it to hand level.

Grasping implements, such as those described by van Zeim in U.S. Pat. No. 4,374,600 and Gaivis in U.S. Pat. No. 5,380,054, have been developed for picking up objects, lifting objects down off of shelves, etc. These devices are useful in reaching and grasping the objects, but do not conveniently move the objects to within reach of the user's hand, generally requiring the object to be placed on a table or the like so that the person can move to the table to pick it up.

Thus, there is an unfulfilled need for devices can grasp an object on the floor or ground, then lift the object to waist level for transfer to the hands, all by remote control without requiring the person to bend or move their body.

SUMMARY OF THE INVENTION

The above noted problems, and others, are overcome by a combined scooping and lifting device that comprises an elongated, cane-like member having a handle at the proximal end and an assembly of normally collapsed lazy tongs at the distal end, a scooping device at the distal end of the lazy tongs, means at the handle for moving the grasping device between a closed position for holding an object and an open position for scooping an object and a mechanism operable by pressing the cane-like member distal end against the floor or other surface to extend the lazy tongs to lift the scooping device upwardly to within reach of the user's hands.

Prior to use, the scooping device is flush with the floor and the lazy tongs are retracted and oriented at an acute angle to the floor.

The scooping device includes two portions hinged together in clam-shell fashion, with the two portions together having a base and upstanding sides. The apparatus is held by a standing person and the two portions hinged apart. The user moves the scooping device to position an object to be lifted between the device portions. The portions are brought together by a manually actuated cable pulling on a bellcrank mechanism to bring the two portions together, scooping up the object.

The lazy tong lifting device has the proximal pair of tong bars attached to the cane like member at one end and to a pivoting extension on the member distal end. As the extension is pressed against the floor, the extension pivots to extend the lazy tongs in a generally vertical direction. Once the scooping device reaches hand level, the user removes the object. Pressure of the member and extension against the floor is released and the lazy tongs are allowed to retract. While the weight of the lazy tong and scoop assembly is sufficient to return the extension to the unextended position, a spring assist may be used if desired.

The scooping device portions are spring loaded to the open position so that when the user releases the scoop actuator the scooping device will automatically return to the open position for further use. If desired, the scoop may be configured to be closed in the default position and opened when the user squeezes the operating lever.

Preferably the scooping device is configure to have a base surface and a back wall when in the floor engaging, scooping, position. As the scooping device is lifted, it is preferably rotated approximately 90° toward the user, so that the back wall now supports the object so that the object is oriented toward the user in the lifted position.

The scooping device may further have two bars attached to the two scoop portions that are brought together into pressure contact with the scooping device is brought to the closed, scooping, position. The bars may be used to pinch objects such as sheets of paper or cloth so they can be lifted in the same manner as objects within the scooping device. Also, a telescoping rod may be provided on the lifting device that can be extended to hook and lift objects such as key rings, necklaces, etc. that can be easily hooked by the rod. The telescoping rod also is convenient for reaching objects underneath cabinets, dressers or in other locations difficult to directly reach with the scooping mechanism.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
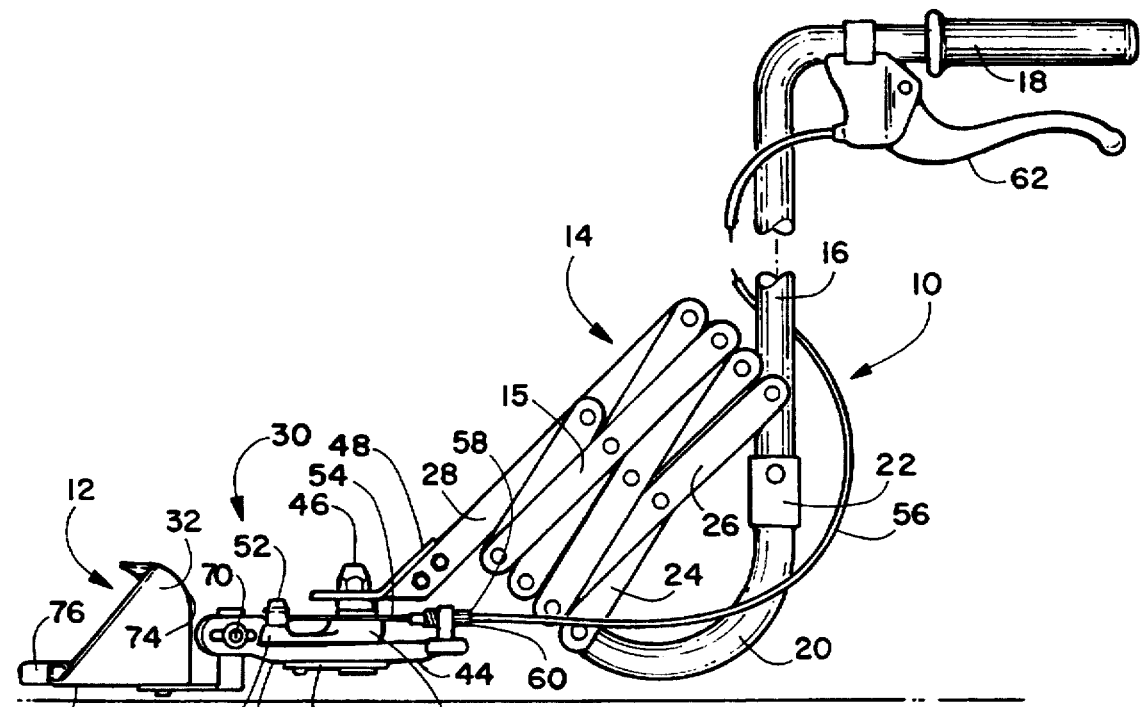
FIG. 1 is a side elevation view of the scooping and lifting apparatus in a ready for use position.

Referring to FIG. 1, there is seen a scooping and lift assembly 10 having a scoop assembly 12 for holding objects to be lifted, a lazy tong assembly 14 for lifting scoop assembly and a cane-like member 16 including means for actuating the scoop and lifting assemblies.

Member 16 has a handle portion 18 at the proximal end and a curved extension 20 mounted by hinge 22 at the distal end. Lazy tong assembly 14 has a plurality of crossing bars 15, with proximal end bars 24 and 26 mounted at their free ends to the distal end of curved extension 20 and to member 16, respectively.

Figure 4:
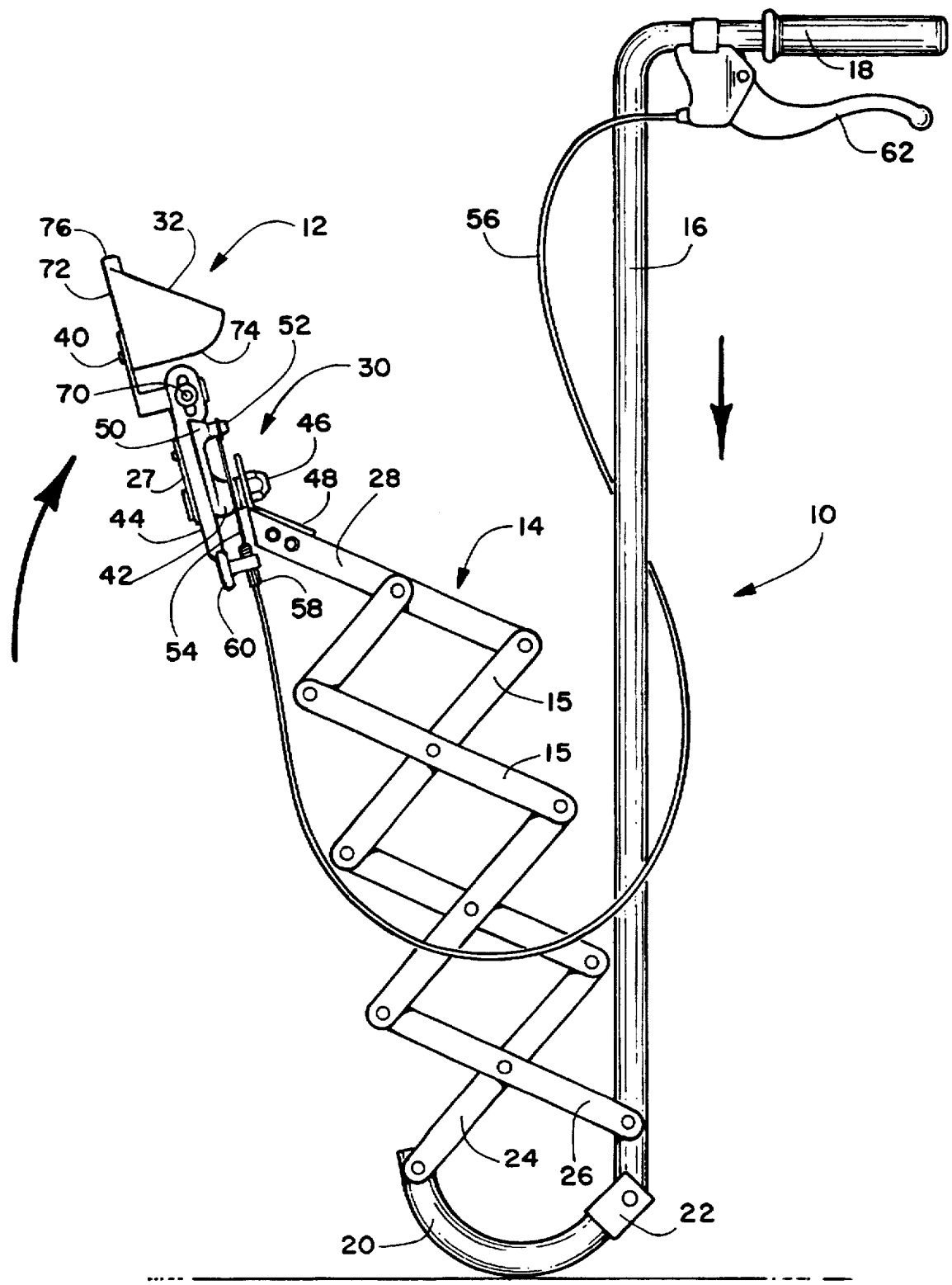
FIG. 4 is a side elevation view of the scooping and lifting device in the lifting position.

When handle 18 is pressed downwardly toward the floor, ground or other surface, curved extension 20 is rotated about hinge 22. This movement brings the free ends of end bars 24 and 26 towards each other, extending lazy tong assembly 14 in a conventional manner. This movement also rotates the extended lazy tong assembly 14 from the approximately 45° acute angle seen in FIG. 1 to the more vertical orientation shown in FIG. 4, moving scoop assembly 12 for the position abutting the floor surface as seen in FIG. 1 to the position at about handle level and near handle 18 as seen in FIG. 4. Extension 16 may have a coating of a rubbery material to prevent slipping when pressed downwardly against a slippery surface.

Releasing the pressure pushing curved extension 20 against the floor will allow lazy tong assembly 14 to return to the FIG. 1 relationship under the force of gravity. If desired, a spring could be provided at hinge 22 to assist this return motion.

Figure 2:
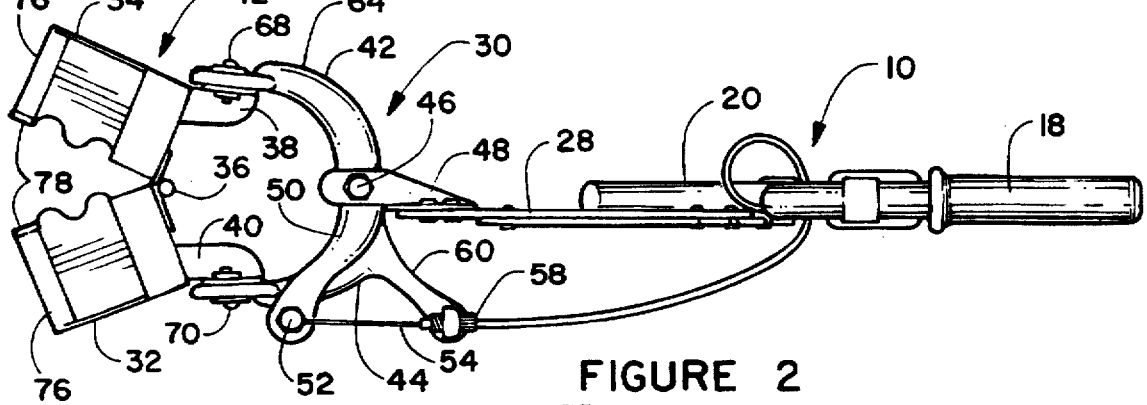
FIG. 2 is a plan view of the scooping and lifting apparatus of FIG. 1 in the open, ready for use, position.
Figure 3:
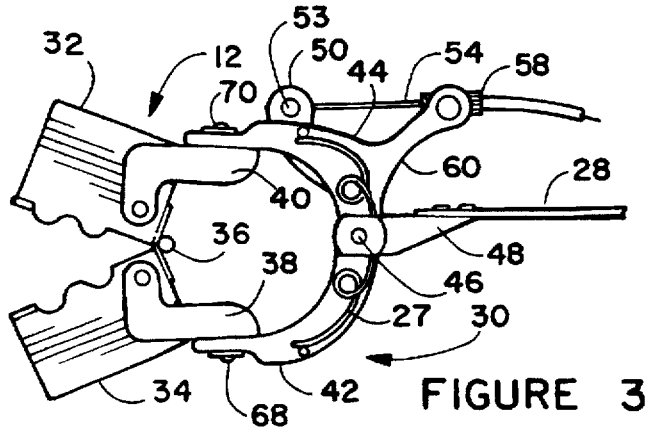
FIG. 3 is a view of the underside of the scooping device, looking upwardly, in the open, ready for use position.

Scoop assembly 12 is shown in the normally open, object retaining, position in FIGS. 1–3 and 5. The assembly is biased to the open position by spring 27 as best seen in FIG. 3. The scoop assembly 12 is mounted on an extended lazy tong distal end bar 28 by an opening and closing mechanism 30.

Two scoop portions 32 and 34 are hingedly connected at the back by hinge 36 and are pivotally fastened to brackets 38 and 40 of actuation mechanism 30. Since brackets 38 and 40 connect to portions 32 and 34 to the left of hinge 36 as seen in FIG. 3, moving brackets 38 and 40 together will close the container.

Actuation mechanism 30 includes two arms 42 and 44 pivotable about bolt 46 securing them to bracket 48 on bar 28. A bellcrank 50 is formed as an extension on arm 42. A pin 52 is mounted on the distal end of bell crank 50 and is rotatable relative thereto. A cable 54 is fastened to pin 52 and extends through a sleeve 56 and adjustable sleeve support 58 mounted on an extension 60 of arm 44. From support 58 cable 54 extends through sleeve 56 to a lever 62 attached to the proximal end of cane-like member 16 at handle 18, as seen in FIGS. 1 and 4. Distal ends 64 and 66 of arms 42 and 44, respectively, are fastened to scoop brackets 38 and 40, respectively, through adjustable fittings 68 and 70, respectively.

When lever 62 is squeezed toward handle 18, cable 56 is withdrawn into sleeve 56, pulling pin 52 and bell crank 50 towards lazy tongs 14, bringing the distal ends of arms 42 and 44 together to close scoop 12 to where scoop portions 32 and 34 are in an abutting relationship (not shown).

Figure 5:
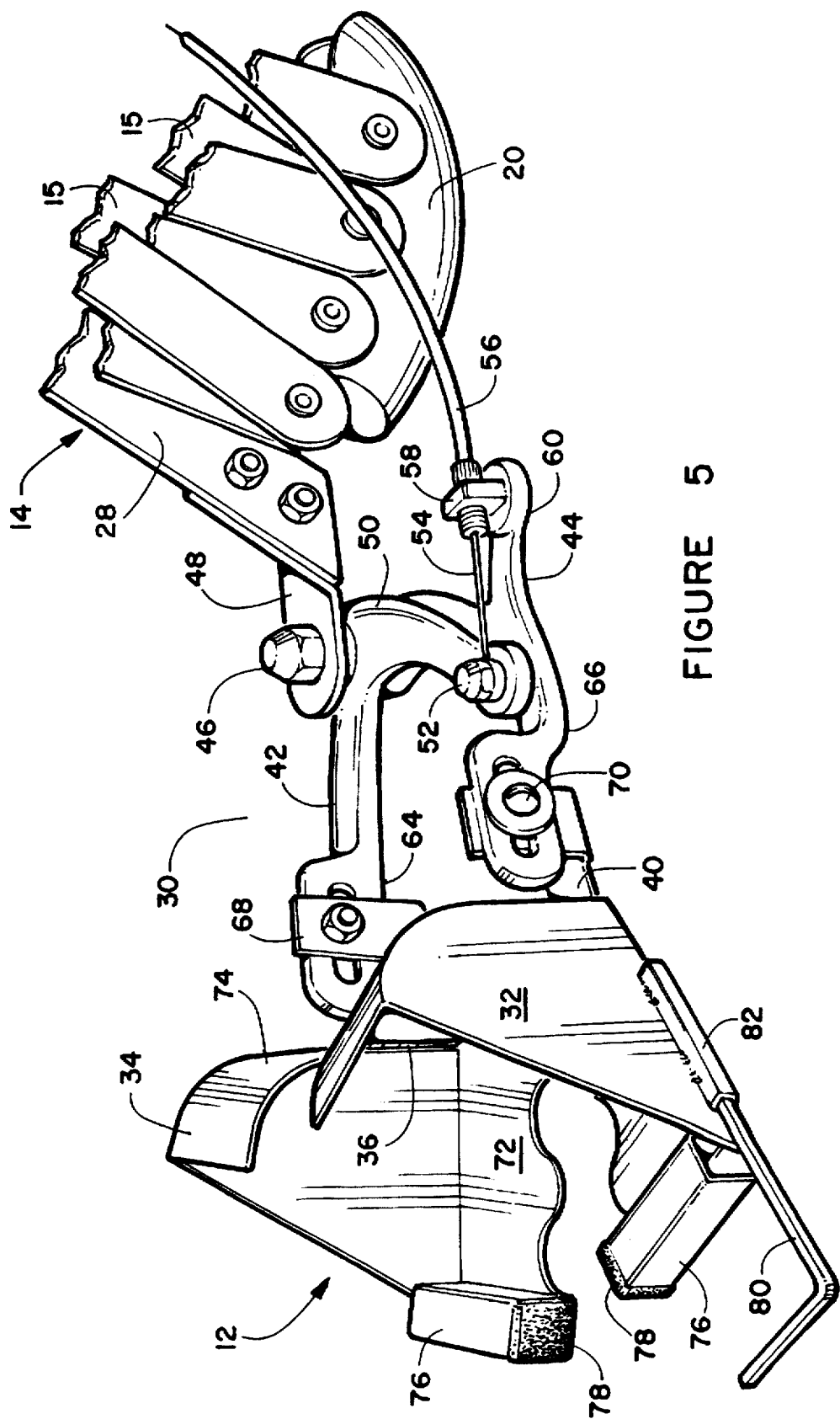
FIG. 5 is a perspective view of the assembly of scooping device, scoop closing mechanism and lazy tong assembly.

To scoop up an object, scoop portions 32 and 34, in the positions best seen in FIG. 2 and 5, are placed on the floor surface on opposite sides of the object. Lever 62 is squeezed toward handle 18, bringing the scoop halves together to form the scoop. Extension 20 is then pressed against the floor, causing the extension to rotate about hinge 22. This causes lazy tong assembly 14 to extend and to rotate to an upwardly extending orientation as best seen in FIG. 4, lifting scoop assembly 12 to a position approximately at the user's hand height and near handle 18, so that the object can easily be removed from scoop assembly 12. As can be seen, a user rotates the scoop assembly so that the object is supported between bottom surface 72 and back side surface 74 to securely support the object and orient the scoop to permit easy removal of an object.

Not all objects have a size or configuration allowing easy scooping, such as towels, papers and the like. Two bars 76 are preferably provided along the opening edges of scoop portions 32 and 34. Each bar 76 preferably has a resilient, rubber-like, gripping surface 78 on edges that abut when the two portions 32 and 34 are brought together. Portions 32 and 34 can be placed on opposite sides of a cloth or the like and brought together by squeezing lever 62 against handle 18, then lifted to the user's hand level.

As a further preferred feature, as seen in FIG. 5, a generally L-shaped rod 80 can be provided, housed in a sleeve 82. When not needed, the rod 80 is slid back into sleeve 82. For clarity, rod 80 and sleeve 82 are not shown in the other Figures. When an object similar to a key ring, necklace, etc. is to be picked up, the scoop assembly 12 can be raised to near the user's hands and rod 80 can be extended as seen in FIG. 5. Scoop assembly 12 is returned to floor level and the object can be hooked on rod 80 and lifted to hand level as described above.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A scooping and lifting apparatus for scooping an object from a floor-like surface and lifting the object to within reach of a user's hands, which comprises:

a scooping assembly having a scooping means movable between an open scooping position and a closed holding position for scooping and holding an object;

an elongated member having a proximal end to be held by a user's hand;

lifting means secured between the distal end of said elongated member and said scooping means for lifting said scooping means to a position adjacent to a user's hands in response to said distal end being pressed against a surface;

means for actuating said scooping means; and means for actuating said lifting means.

2. The apparatus according to claim 1 wherein said scooping means comprises a scoop assembly made up of two hingedly connected portions, each portion having a generally flat base and a back wall, the flat bases and back walls of said two hingedly connected portions having matching base and back wall edges to form a container when brought together, whereby an object on a floor-like surface between said portions in said open scooping position will be scooped into said container when said hingedly connected portions are brought together.

3. The apparatus according to claim 2 wherein said means for actuating said scooping means comprises first and second arms hinged together at proximal ends and having a distal ends secured to each said hingedly connected portion, a bellcrank assembly for moving said distal ends toward each other for bringing said hingedly connected portions together, a sheathed cable having a distal end operatively connected to said bellcrank assembly and lever means at said elongated member proximal end operatively connected to said cable.

4. The apparatus according to claim 2 wherein each of said two hingedly connected portions further includes a gripping bar having ends configured so that when said two hingedly connected portions are brought together, said ends are in pressure contact and grip any object therebetween.

5. The apparatus according to claim 2 further including at least one extensible rod mounted on a hingedly connected portion for engaging a ring-like object for lifting.

6. The apparatus according to claim 1 wherein said lifting means comprises a lazy tong assembly and said means for actuating said lifting means comprises a hinged extension on said elongated member distal end, said lazy tong assembly having a proximal end secured to said elongated member distal end and to said hinged extension and a distal end secured to said scoop assembly, whereby pressing said hinged extension against a surface will extend and rotate said lazy tong assembly to lift and rotate said scoop assembly to a position within reach of a user's hands.

7. A scooping and lifting apparatus for scooping an object from a floor-like surface and lifting the object to within reach of a user's hands, which comprises:

- an elongated cane-like member having, at the proximal end, a handle means;
- a normally collapsed lazy tong assembly secured at its proximal end to the distal of said elongated cane-like member;
- a scooping device secured to the lazy tong assembly distal end;
- means at said handle means for moving said scooping device between a closed, object containing, position and an open, object release position; and
- extension means at the distal end of said elongated cane-like member for extending said lazy tong assembly to raise said scooping device to a position within reach of the user's hands when said distal end of said elongated cane-like member is pressed against the floor surface.

8. The apparatus according to claim 7 wherein:

- said extension means hingedly connected to the distal end of said elongated cane-like member;
- means for operatively connecting said lazy tong assembly between both said distal end of said elongated cane-like member and the distal end of said hinged extension means;
- whereby pressing said elongated cane-like member toward said floor will bring said hinged extension means into contact with the floor and pivot said hinged extension means, extending said lazy tong assembly and moving said scooping device in an approximately vertical direction to within reach of a standing user's hands.

9. The apparatus according to claim 8 wherein said lazy tong assembly is configured to rotate said scooping device through a predetermined angle toward a user holding said handle means, and said scooping device is configured to support an object throughout said rotation.

10. The apparatus according to claim 7 wherein said means for moving said scooping device between object scooping and release positions comprises:

- two scooping device container portions hinged together along an edge so as to be pivotable between a pivoted together holding position and a pivoted apart release position;
- closing means for moving said container portions from said open position to said closed position;
- biasing means for biasing said container portions to said open position;
- a jacketed cable extending from said closing means to said handle means;
- lever operating means at said handle means for moving said cable to move said container portions to said closed position.

11. The apparatus according to claim 10 wherein said closing means comprises first and second arms pivotally connected at proximal ends, means for connecting distal ends of said first and second arms to said container portions, and a bellcrank means for moving said container portions together when actuated by said cable.

12. The apparatus according to claim 10 wherein said container portions further include gripping means on said scooping device for gripping an object between said container portions as said container portions are moved toward said closed position.

13. The apparatus according to claim 10 wherein one of said container portions includes an extensible rod for engaging and lifting a ring-like object with said container portions.

* * * * *